United States Patent [19]

Ashmead

[11] Patent Number: 4,529,434
[45] Date of Patent: Jul. 16, 1985

[54] ACTIVATED CHARCOAL AS PROMOTER FOR PHOSPHORUS UPTAKE IN PLANT TISSUES

[75] Inventor: Stephen D. Ashmead, Fruit Heights, Utah

[73] Assignee: Albion International, Inc., Clearfield, Utah

[21] Appl. No.: 619,561

[22] Filed: Jun. 11, 1984

[51] Int. Cl.$^3$ ................................................ C05B 7/00
[52] U.S. Cl. .......................................... 71/34; 71/24; 71/64.1
[58] Field of Search .................... 71/1, 11, 24, 27, 31, 71/33, 34, 64.10; 55/74

[56] References Cited

U.S. PATENT DOCUMENTS 1,660,642  2/1928  Barnebey .................. 55/74
2,684,295  7/1954  Eyster ..................... 71/24 X
4,084,398  4/1978  Willard, Sr. ............... 71/24 X Primary Examiner—Ferris H. Lander
Attorney, Agent, or Firm—Thorpe, North & Western

[57] ABSTRACT

Phosphorus uptake in plant tissues is increased by applying to immature plants, as a foliar spray, an aqueous composition consisting of a mixture of polyphosphates and activated carbon wherein the polyphosphates are selected from the group consisting of polyphosphoric acid, potassium polyphosphate and ammonium polyphosphate and mixtures thereof.

10 Claims, No Drawings

ACTIVATED CHARCOAL AS PROMOTER FOR PHOSPHORUS UPTAKE IN PLANT TISSUES

BACKGROUND OF THE INVENTION

This invention relates to a composition and method for increasing the uptake of phosphorus into the tissues of living plants. More particularly, this invention relates to a composition and method for enhancing the uptake of phosphorus into crop plant tissues.

The use of potassium polyphosphates in liquid fertilizers for supplying phosphorus and potassium is well known. For example, Cox, U.S. Pat. No. 3,856,500 teaches potassium and ammonium polyphosphates containing heavy metal micronutrients as liquid fertilizers.

One problem associated with the use of potassium polyphosphates has been the inability of the plant tissue to absorb adequate quantities of phosphorus and potassium for proper plant growth. The proposed remedy to this problem has been to increase the dosage in an attempt to force the desired absorption. However, this results in inefficient use of the potassium polyphosphate which can prove to be expensive to the farmer and wasteful of materials.

One proposed solution to this problem is contained in pending application, Ser. No. 495,269, filed May 17, 1983 in the names of H. H. Ashmead and H. H. Hsu which is drawn to a composition of polyphosphates containing a minor amount of hydrolyzed protein. The protein hydrolysate serves as a promoter to increase the uptake of phosphorus and potassium into plant tissues.

It has now been found that protein hydrolysates are not the only promoters for increasing phosphorus uptake into plant tissues.

OBJECTS AND SUMMARY OF THE INVENTION

It is an object of the present invention to provide a composition of ingredients which will enable increased levels of absorption of phosphorus from potassium polyphosphates into plant tissues over that obtained when applying polyphosphates alone.

It is also an object of the present invention to provide a composition which will enable increased levels of absorption of phosphorus into plant tissues through the use of activated carbon combined with polyphoshates.

Another object of this invention is to provide a composition and method of increasing the absorption of phosphorus into plant tissues through foliar application by means of a solution containing polyphosphates and also containing activated carbon as a promoter for phosphorus uptake.

These and other objects may be obtained by means of an aqueous composition of polyphosphates in the form of polyphosphoric acid, potassium polyphosphate or ammonium polyphosphates, containing an effective amount of activated carbon. This composition is applied as a foliar spray to immature plant tissues.

DETAILED DESCRIPTION OF THE INVENTION

It is customary in the fertilizer industry to refer to nitrogen, phosphorus and potassium by their chemical symbols N, P and K, and to collectively refer to combinations containing them as NPK fertilizers. The percentage of each are reported in terms of percent N, percent $P_2O_5$ (phosphorus pentoxide) and percent $K_2O$ (potassium oxide) even though these elements are not present specifically in that form.

Polyphosphoric acid may be commercially obtained as may polyphosphate salts. Potassium polyphoshpates may be prepared by reacting superphosphoric acid with a basic potassium compound such as potassium hydroxide, carbonate or bicarbonate. The distinction between meta-, pyro- and other polyphosphates from orthophosphates is well known and documented such as by U.S. Pat. No. 3,856,500 and standard chemical texts. Therefore, it would serve no useful purpose to attempt to discuss the chemical and physical properties of polyphosphoric acid, potassium or ammonium polyphosphates.

However, because polyphosphates are relatively unstable and tend to convert back to orthophosphates in the presence of water, they should be used as soon as possible after being diluted for use as a foliar spray.

The use of activated carbon as a promoter for increasing polyphosphate uptake is believed to be unique. Activated carbon, because of its inertness and extremely high surface area, has been primarily utilized to absorb gases or to filter out impurities from solutions. Activated carbon is inert and insoluble in aqueous solutions. It is therefore highly unexpected that this ingredient would, in some way, enable foliar plant tissues to absorb increased amounts of phosphorus from polyphosphates. Also, there is evidence to show increased amounts of carbon in these plant tissues. Whether it is the activated carbon that is absorbed is not known. It may be that the activated carbon combined with the polyphosphates serves in some way to enable a plant to absorb greater quantities of carbon dioxide from the atmosphere or, in the alternative, to better and more efficiently utilize the carbon dioxide when it is absorbed. The use of activated carbon alone does not show the same results regarding carbon uptake as does carbon combined with polyphosphates.

The formulations are preferably prepared as a field solution concentrate which may subsequently be diluted with water just prior to using to provide the proper dosage. Polyphosphoric acids may contain about 80 to 85% by weight $P_2O_5$. On the other hand fertilizer grade potassium and ammonium polyphosphate blends may be prepared containing about 2 to 5% nitrogen, 15 to 19% phosphorus (as $P_2O_5$) and 15 to 19% potassium (as $K_2O$). Depending upon the form of polyphosphate used, field solution concentrates may be prepared containing about 0.2 to 20% by weight polyphosphate and a similar range, i.e. 0.2 to 20% by weight, of activated carbon. However, the ratio of polyphosphate to carbon may vary anywhere from about 0.1:1 to 1:0.1. Preferably the polyphosphate will be either polyphosphoric acid or a blend of potassium and ammonium polyphosphates. The field solution concentrate is prepared by admixing the various components with sufficient water to form the desired concentration of ingredients. Surfactants, wetting agents or other additives conventionally used in foliar sprays may also be added to the concentrate if desired.

The field solution concentrate is adapted for use as a foliar spray by being diluted with the desired amount of water in a mixing tank or sprayer and thoroughly mixed just prior to application. Dilution ratios may vary from as low as 5 volumes of water per volume of concentrate to as high as 200 volumes of water per volume of concentrate, i.e., ratios of from 5:1 to 200:1. Generally speaking, dilution ratios from about 10:1 to 150:1 are preferable. Since activated carbon is insoluble in aqueous solutions the spray solution should be agitated to keep the carbon particles in suspension. The spray equipment should be clean and appropriately sized to prevent plugging of the nozzles by carbon particles.

Since the NPK dosage requirements may vary according to plant species, geographical location, climate, season of year, etc., it is not possible to specify exact dosages. However, the amount to be applied to any given crop will be referred to herein as an "effective amount". Effective amounts may be determined by calculation or empirically by those having ordinary skill in the art. For this reason, the invention does not lie as much in specific concentrations as in the discovery that a combination of polyphosphates and activated carbon serves to increase phosphorus contents in plant tissues when the combination is applied to plants as a foliar spray.

Preferably, the composition of the invention is applied to immature crops as a foliar spray one or more times at intervals between germination of the plant and maturity of the fruit or crop to be obtained from the plant.

The invention can best be illustrated by the following example which shows the unexpected increase in phosphorus into plant tissues. The example is for purposes of illustration and is not to be interpreted as defining the scope of the invention.

EXAMPLE

Sweet corn (Hybrid Golden Beauty) was used to illustrate the invention due to the fact that corn plants grow rapidly in green house experiments and corn is not a nitrogen fixing plant and is therefore completely dependent on fertilizers and water applications.

All plantings were treated in the same manner with the only variants being in the ingredients contained in the foliar sprays. The corn was planted, fed and watered as according to the following procedure.

Planting pots (gallon plastic buckets) were filled with 10 lbs. of silica sand. Each bucket was wetted with 750 mls. of distilled water. The wetted sand in each pot was then planted with eight corn seeds at a depth of between about ¾" and 1" with the sand covering the seeds being compressed slightly.

The pots were watered weekly with Hoagland's #2 nutrient solution and with distilled water as needed. Hoagland's #2 nutrient solution is a combination of calcium nitrate tetrahydrate, potassium nitrate, magnesium sulfate heptahydrate, ammonium dihydrogen phosphate, boric acid, manganese sulfate monohydrate, zinc sulfate, cupric sulfate pentahydrate, sodium molybdate dihydrate and ferrous tartrate containing 196 ppm nitrogen as nitrate, 14 ppm nitrogen as ammonia, 160 ppm calcium, 234 ppm potassium, 48 ppm magnesium, 31 ppm phosphorus, 0.1 ppm manganese, 0.02 ppm zinc, 0.01 ppm copper, 0.01 ppm molybdenum, 1.0 ppm ironand 62 ppm sulfur.

Three weeks after germination replicates of four containers each were separated and the plants in each replicate were sprayed with a foliar spray until runoff. A different solution was used for each replicate as follows: Replicate A was sprayed with a solution consisting of distilled water (control), Replicate B was sprayed with a solution containing only activated carbon (0.2 gms carbon per 100 mls solution), Replicate C was sprayed with a solution containing only polyphosphates (0.06 ml polyphosphoric acid per 100 mls solution) and Replicate D was sprayed with a solution containing both polyphosphates and activated carbon (0.2 gms carbon and 0.06 ml polyphosphoric acid per 100 mls solution). Eight weeks after germination the plants were harvested and the roots were cut from the foliage. The harvested foliage and roots were washed in distilled water to remove all foreign matter and were then dried in an oven maintained at 75 degrees C. until completely dry. The foliage was weighed and then analyzed for phosphorus and carbon content.

The roots were also analyzed for phosphorus content. Although four containers were used for each replicate, the results listed in the following table are an average of the four containers which are not reported individually.

TABLE I

| Replicate | % Change in Plant Phosphorus | |
|---|---|---|
| | Foliage | Roots |
| A (control) | 0 | 0 |
| B (carbon) | +0.009 | −0.13 |
| C (polyphosphate) | +0.009 | +0.12 |
| D (carbon + polyphosphate) | +0.026 | +0.22 |

The increase in phosphorus content in both foliage and roots is clearly evident from Replicate D results.

The above description sets forth the invention in the best mode presently available.

I claim:

1. A composition for increasing the phosphorus content in plant tissues comprising an aqueous concentrate containing between about 0.2 to 20% by weight of one or more polyphosphates selected from the group consisting of polyphosphoric acid, potassium polyphosphate and ammonium polyphosphate and mixtures thereof and 0.2 to 20% by weight activated carbon.

2. A composition according to claim 1 wherein the weight ratio of polyphosphate to activated carbon is between about 0.1:1 and 1:0.1.

3. A composition according to claim 2 wherein the polyphosphate is polyphosphoric acid.

4. A composition according to claim 2 wherein the polyphosphate is a blend of potassium and ammonium polyphosphates.

5. A method of increasing the phosphorus content of plant tissues which comprises applying to living immature plant tissues, as a foliar spray, an aqueous composition prepared by diluting with water a liquid concentrate containing between about 0.2 to 20% by weight of one or more polyphosphates selected from the group consisting of polyphosphoric acid, potassium polyphosphate and ammonium polyphosphate and mixtures thereof and 0.2 to 20% by weight activated carbon.

6. A method according to claim 5 wherein the weight ratio of polyphosphate to activated carbon is between 0.1:1 and 1:0.1.

7. A method according to claim 6 wherein the polyphosphate is polyphosphoric acid.

8. A method according to claim 6 wherein the polyphosphate is a blend of potassium and ammonium polyphosphates.

9. A method according to claim 6 wherein the liquid concentrate is diluted with water at a volume ratio of between about 5:1 and 200:1 prior to being applied to plant tissues.

10. A method according to claim 9 wherein the liquid concentrate is diluted with water at a volume ratio of between about 10:1 and 150:1 prior to being applied to plant tissues.

* * * * *